United States Patent [19]

Chan et al.

[11] Patent Number: 4,812,981
[45] Date of Patent: Mar. 14, 1989

[54] MEMORY MANAGEMENT SYSTEM IMPROVING THE EFFICIENCY OF FORK OPERATIONS

[75] Inventors: Carl Chan, Framingham; Edwar A. Feustel, Sherborn, both of Mass.

[73] Assignee: Prime Computer, Inc., Natick, Mass.

[21] Appl. No.: 790,839

[22] Filed: Oct. 24, 1985

[51] Int. Cl.[4] .................. G06F 15/00; G06F 12/12
[52] U.S. Cl. ................................. 364/200; 364/300
[58] Field of Search ... 364/200 MS File, 900 MS File, 364/300

[56] References Cited

U.S. PATENT DOCUMENTS

| 4,104,718 | 8/1978 | Poublan | 364/200 |
| 4,577,274 | 3/1986 | Ho et al. | 364/200 |
| 4,584,639 | 4/1986 | Hardy | 364/200 |
| 4,589,093 | 5/1986 | Ippolito et al. | 364/900 |
| 4,758,951 | 7/1988 | Sznyter, III | 364/200 |

OTHER PUBLICATIONS

A UNIX System Implementation for System/370 by W. A. Felton, G. L. Miller, and J. M. Milner—published by AT&T Bell Laboratories Technical Journal, vol. 63, No. 8, Oct. 1984, pages 1751 through 1767.
Virtual Memory by Peter J. Denning—published in Computing Surveys, vol. 2, No. 3, Sep. 1970, pages 153 through 189.
The Evolution of UNIX System Performance by J. Feder—published by AT&T Bell Laboratories Technical Journal vol. 63, No. 8, Oct. 1984, pp. 1794-1814.

Primary Examiner—Raulfe B. Zache
Assistant Examiner—Thomas C. Lee
Attorney, Agent, or Firm—Lahive & Cockfield

[57] ABSTRACT

Methods and apparatus for implementing fork operations on UNIX or UNIX-emulating operating systems, particularly in multi-user environments reduce the copy time, the number of page faults and, consequently the input-output ("I/O") operations between the central processing unit, main memory and auxilliary memory. In one aspect of the invention, fork operations are executed by redefining those pages of the parent process image resident in main memory as pages of a child process image and modifying the page maps accordingly. Page faults are thereby eliminated for pages located in auxiliary memory. Additional improvements in performance are obtained by monitoring the level of main memory utilization and selecting optical procedures based on the amount of excess capacity in main memory.

10 Claims, 2 Drawing Sheets

MEMORY MANAGEMENT SYSTEM IMPROVING THE EFFICIENCY OF FORK OPERATIONS

BACKGROUND OF THE INVENTION

The technical field of this invention is data processing and, in particular, memory management for multiple user systems that employ demand paging and a virtual memory architecture.

Data processing systems generally include a central processing unit ("CPU"), a storage system (or "main memory"), peripheral devices and associated interfaces. Typically, the main memory consists of relatively low cost, high-capacity, digital storage devices. The peripheral device may be, for example, a non-volatile auxiliary memory medium, such as a magnetic disk or magnetic tape drive.

In order to carry out tasks, the central processing unit of such systems executes a succession of instructions which operate on data. The succession of instructions and the data those instructions reference are referred to as a program. The execution of a program by the central processing unit is referred to as a process. The address space that contains the instructions and data for a process is called the process image. A process image typically is distributed between the main memory and the auxiliary memory, depending upon the size of the process and the immediate needs of the central processing unit.

An architecture called virtual memory is employed in many data processing systems where service is provided to a number of users. On some systems, virtual memory is divided into segments, each of which is further divided into pages with each page accomodating a fixed number of words. In a number of systems, for example, the Series 50 systems manufactured by Prime Computer, Inc. of Natick, Massachusetts, the addresses of the segments and pages are allocated by an operating system and can be arranged in the main memory in a random fashion. To the user, however, an appearance of continuity and unlimited memory space is presented and the user need not be concerned with the actual interleaved nature of programs in the main memory. Moreover, at any given time some pages of a program may reside in the auxiliary memory rather than the main memory. Page maps and the like, are employed by the operating system to translate virtual memory addresses into physical locations in main or auxiliary memory.

When a process begins, it is necessary to retrieve pages containing instructions or data from memory. When a page of a program is needed by a process but is not resident in main memory, a "page fault" occurs. Demand paging refers to a method of fetching pages from auxiliary memory. Demand paging systems transport just one page (containing the next instruction to be executed or data to be manipulated) into main memory at a time. A replacement policy is typically employed by the operating system at the same time to "page out" instructions or data that are not likely to be needed again in the near future. For example, the least recently used page can be transferred from main memory to auxiliary memory. Each time a page is transferred from one memory location to another, the address and page maps must be revised accordingly.

One operating system which has gained widespread acceptance in the industry is the UNIX operating system. (UNIX is a trademark of the AT&T Bell Laboratories). The UNIX system is designed to be "portable", that is to say, programs coded to interface with UNIX on one data processing system can be run on other hardware as well. Many of the data processing systems currently being manufactured employ either the UNIX operating system or an operating system that emulates UNIX functions. The Prime Computer Series 50 systems, for example, can be configured to run PRIMIX, a UNIX emulation which operates in conjunction with the Series 50 system's PRIMOS operating system. (PRIMIX and PRIMOS are trademarks of Prime Computer, Inc.).

UNIX is a multi-user, time-sharing, operating system using a tree-structured file system. Other noteworthy functional features are its logical I/O capabilities, pipes, and forks. "Logical I/O" allows the user to specify the input and output files of a program at runtime rather than at compile time, thus providing greater flexibility. "Piping" is a UNIX feature which allows the buffering of input and output to and from other processes. "Forking" is a UNIX method for creating new processes.

By themselves, these UNIX features offer no inherent benefits. However, the UNIX command environment (called the SHELL) provides easy access to these operating system capabilities and also allows them to be used in different combinations. With the proper selection and ordering of system commands, logical I/O, pipes, and forks, a UNIX user at command level can accomplish work which on another system would require writing and generating an entirely new program. This ability to easily create application program equivalents from command level is one of the unique and primary benefits of the UNIX operating system.

A problem can often arise when a UNIX-type operating system is implemented in a multiple user environment. The basic operation of a "fork" in the UNIX system involves spawning a new process, and then copying the process image of the parent (the process making the fork call) to the child (the newly spawned process). The time required to copy over a process image is proportional to the size of the process image. Therefore, a generic problem of running a UNIX-type system on a large virtual memory CPU architecture, is that the process image copy time of a fork operation can be a performance bottleneck.

The performance problem is further aggravated in a multi-user environment because many fork operations are taking place simultaneously. Each page fault generated while copying the process image from parent to child can potentially displace a page in another process, indirectly causing the other process to incur more page faults when it runs. Thus, the incremental paging caused by each fork operation can dramatically increase the overall paging rate of the system. The end result can be very poor performance when the system is heavily used. This problem is typically referred to as "thrashing".

There exists a need for better methods and systems of memory management, particularly when UNIX-type operating systems are employed in multiple user, virtual memory architectures. A memory management system that can reduce the performance bottlenecks and potential thrashing associated with UNIX fork operations, would satisfy a substantial need in the industry.

SUMMARY OF THE INVENTION

The present invention is useful whenever UNIX-type operating systems are implemented in data processors having virtual memory architectures. The invention reduces memory management problems in UNIX operations as well as those typically encountered when other operating systems are used to emulate UNIX operations.

In one aspect of the invention, a fork call is executed by redefining those pages of the parent process which are resident in main memory as pages of a child process image; modifying the page maps in response to the redefined pages; and accessing the auxiliary memory to copy the remaining pages of the parent process image not resident in main memory as demanded for the child image.

In conventional UNIX and UNIX-emulating systems, the process image copying is accomplished by examining each active segment in the parent's logical address space and copying all previously referenced pages in the segment from the parent to the child, page by page. If the parent page is resident in memory, it is copied to the child. If the parent page is not resident in memory, then even before the copy can occur, a page fault must take place and the address maps must be updated. The page must be transferred into main memory and copied to satisfy the child process. In most cases, a page fault will also occur whenever the parent page is copied (whether or not it is resident in main memory) because space must be made available for the child page. The overall result is often substantial CPU page-fault and copying overhead.

If the case of a blank page is ignored, each parent page can be examined and found to be in one of three states, when copying a parent process image into a child image:
1. Resident in main memory and not modified
2. Resident and modified
3. Not resident in main memory
(A parent page can also be found to be blank—not yet referenced—because typically every page of each active segment of the parent's logical address space is examined even though some of the pages in a given segment may not be in use. In this situation, both the conventional method and the present invention pass over the blank page and proceed to the next page or next active segment).

For pages found in the first state (resident and not modified), the present invention substantially reduces the copy time, the number of page faults and consequently, the input/output ("I/O") operations between the CPU, main memory and auxiliary memory when conducting a UNIX fork operation. By effectively passing the set of physical pages belonging to parent process (i.e., the parent working set) to the child, page faults and possible I/O operations associated with the creation of child pages are eliminated. Additionally, parent-to-child copying time is eliminated. Since it is the child process that usually continues to be executed after a fork operation has been initiated, the loss of immediate access to the parent process image is an insignificant trade-off. Most of the time, the parent process simply waits for the child process to complete its work.

When practicing the present invention on pages in the second state (resident but modified), the virtual page normally is first paged out to auxiliary memory, before redefining it as the child page. Thus, at least one I/O operation is required. Nonetheless, this is preferable over the CPU overhead, page fault and possible I/O operations necessary to create a child page under prior art techniques. However, on a lightly used system where there is more main memory than is needed to run the number of currently active programs, it is possible to eliminate the parent page I/O operation to auxiliary memory. An optimizing feature of the invention for pages in the second state, therefore, calls for two page faults to be taken when the system is lightly used as the parent page is copied to the child page. In this manner, the minimum number of I/O operations is always chosen.

For parent pages in the third state (not resident), an optimizing feature can again be employed. For non-resident pages, the conventional technique requires three I/O operations when the system is heavily used. When practicing the invention, only two I/O's must be carried out. One I/O is required to read in the parent page from auxiliary memory, and another is needed to copy it to the child page in auxiliary memory.

However, if physical memory usage is low, then the optimization used for parent pages found in the second state can also be used. That is, the parent page is copied directly to the child page. Although two page faults are generated, the I/O to write the child page to auxiliary memory is eliminated. Once again, better performance is achieved because it takes less real time to complete the page faults than to complete an I/O, and the minimal number of I/O operations is always chosen.

Alternatively for pages not resident in main memory on a lightly used system, the parent page can be read into main memory and then redefined as the child page. This approach reduces CPU overhead even further by eliminating a page fault on the child and the copying time from the parent to the child page.

The invention will next be described in connection with certain preferred embodiments; however, it should be clear that various changes and modifications can be made without departing from the spirit or scope of the invention. For example, although the summary and detailed description describe a data processing system employing a main memory and an auxiliary (i.e. disk) memory, other levels of memory can also be added. In many systems, including the Prime Series 50 systems, a high speed memory or data cache is also incorporated to store a limited amount of data that are most likely to be needed by a user at a particular time; the use of such data caches and associated data verification means is, of course, compatible with the present invention. Similarly, the invention can find use in multiple processor data processing systems where the execution of different aspects of a process are conducted in parallel.

Detailed Description

Figure 1:
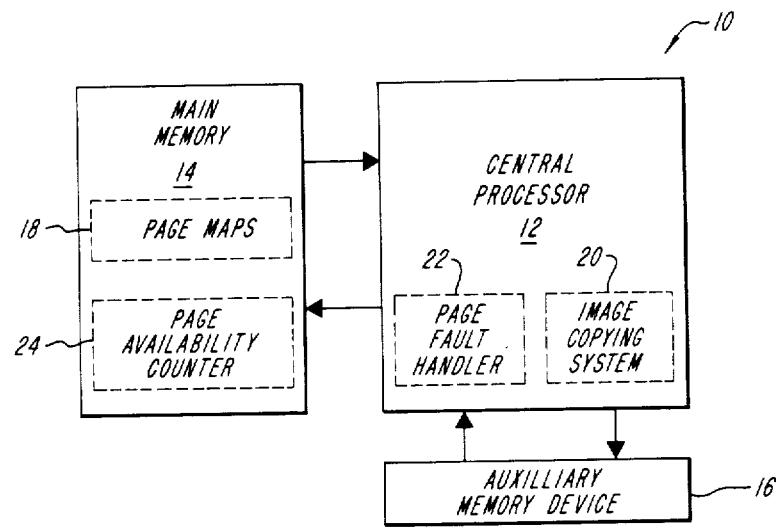
FIG. 1 is a schematic block diagram of a data processing system employing the present invention.

In FIG. 1, a schematic block diagram of a memory management system 10 is shown including central processor 12, main memory 14, an auxiliary memory device 16, page maps 18 (typically stored in main memory) and a page availability counter 24 (also typically stored in main memory). The central processor 12 further includes an image copying system 20 and a page fault handler 22. The image copying system and page fault handler can be implemented by hardware, firmware or software and are typically implemented by a combination of these means. In function, the portions of the central processor 12 not germane to the present invention as well as the main memory 14, auxiliary memory device 16 and page maps 18 in the present embodiment are similar to corresponding elements in the Series 50 Systems manufactured by Prime Computer, Inc., of Framingham, Mass.

In the illustrated embodiment, the central processor 12 can be operated by the PRIMOS operating system. PRMIX, a UNIX-emulating program, is run on PRIMOS, translating UNIX system calls into equivalent PRIMOS functions. The central processor 12 executes fork operations by employing the image copying system 20 in conjunction with page fault handler 22. When a fork operation is called for, the imaging copying system 20 redefines the pages of the parent image that are resident in main memory (and not modified) as pages of the child process image, and revises the page maps 18 in response to the redefined pages. It also activates the page fault handler 22 to retrieve from auxiliary memory those pages of the parent process image not resident in main memory. Additionally, the image copying system 20 interacts with the page fault handler 22 to copy modified pages into auxiliary memory when necessary and to copy selected pages into auxiliary memory when new pages are needed for the child process image. The page availability counter 24 determines the level of system utilization and activates certain optimizing features, as discussed below, to reduce the number of I/O operations.

Figure 2:
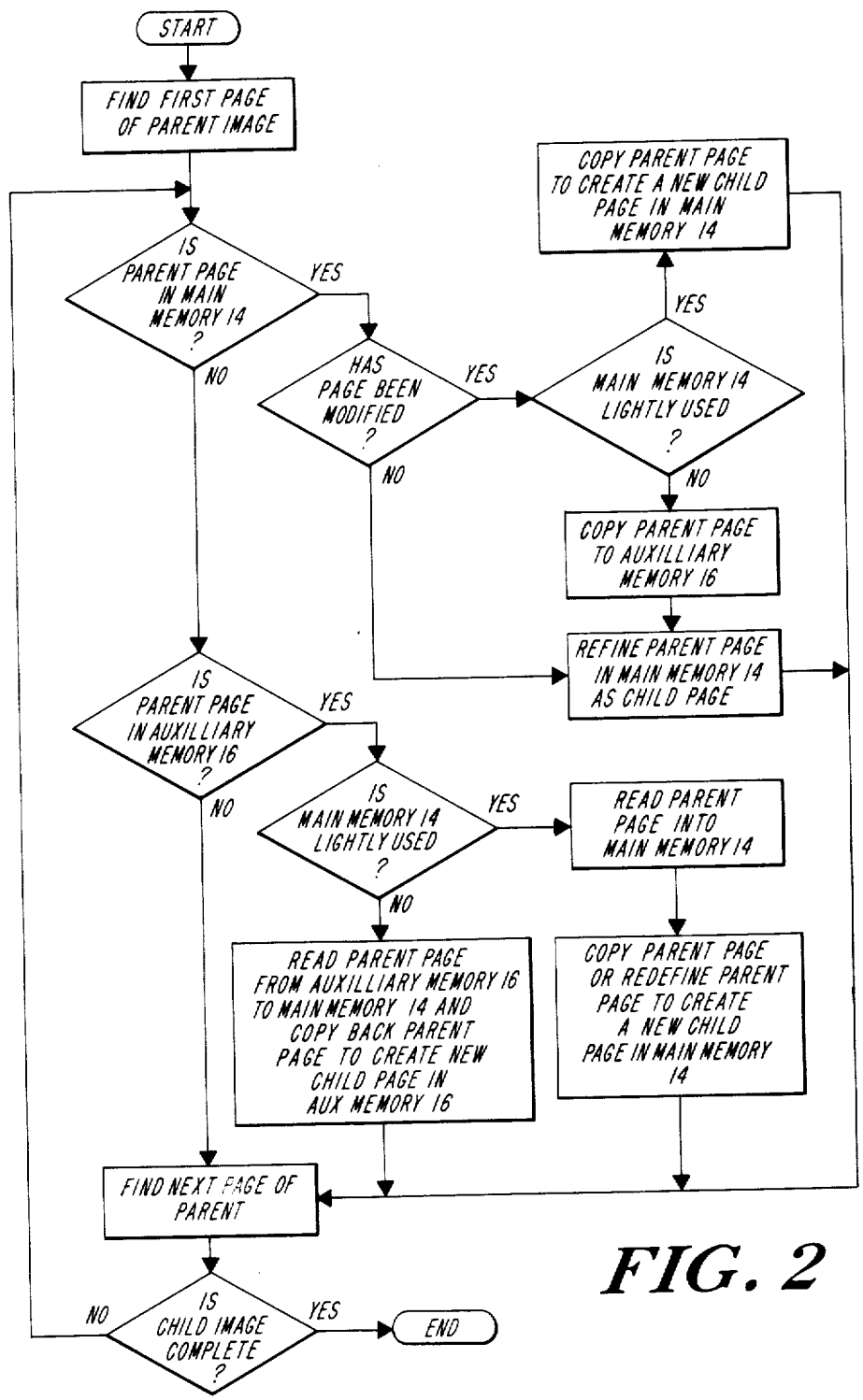
FIG. 2 is flow chart depicting a method of practicing the present invention.

In the FIG. 2, the operation of the image copying system 20 is further illustrated by a flow chart of the steps followed in creating the child image. The image copying system of the present invention searches for the first page of the parent image and determines whether the parent page is in main memory. The location of the page (resident or non resident) is determined, for example, by examination of a page map residence bit in Prime Series 50 computers. If the page is in main memory, the page is examined to determine whether the contents have been modified. Similarly, for the example of Prime Series 50 systems, the state of page (modified or not modified) is determined by examining a page map modified state bit. If the parent page is in main memory and has not been modified, the parent page is simply redefined as the child page.

If the page in main memory has been modified and the system is heavily used, the contents must first be recorded in the auxiliary memory. Once this is completed, the parent page is defined as a child page and the page maps are revised accordingly. Likewise, if the parent page was not located in main memory and the system is heavily used, the parent page is obtained from auxiliary memory and then copied back to auxiliary memory to form the child image.

The optimizing features of the invention are also shown in FIG. 2. These features are employed when the system is only lightly used and it is not likely that the main memory capacity (or some fractional "threshold" thereof) will be exceeded. The optimizing features are used in those instances when a parent page in main memory has been modified or when the parent page is found in auxiliary memory. In these aspects of the invention, the system first determines whether a main memory threshold has been exceeded. This is accomplished for example in the Prime Series 50 systems by examining the page availability counter. In one embodiment, the system is considered lightly used if 100 or more pages are available (unused) in main memory at any given time.

If the parent page is resident in main memory but has been modified, and the main memory capacity has not been exceeded, the parent page is just copied onto a new child page. If the parent page is in auxiliary memory, and main memory capacity has not been exceeded, then the parent page is read into main memory and either copied or redefined to create a child page.

Once this process is completed for the first page of the child image, it is repeated over and over again as the subsequent pages are demanded until the child image is completed.

We claim:

1. A method of copying a parent process (or task) having pages of information to a child process (or task) during a fork operation in a data processing system which employs virtual addressing to reference a physical memory, at least one page map to define the relationship between virtual addresses and their physical locations, and demand paging to allocate a logic address space, defining a process, between a main memory and a lower density auxiliary memory, the pages of the parent process distributed in the main memory and the auxiliary memory wherein said pages resident in the main memory comprise modified and unmodified pages, the method comprising;

a. redefining the unmodified pages of the parent process resident in main memory as pages of a child process;

b. modifying the page map to indicate the pages resident in main memory redefined from the parent process to the child process; and c. copying pages of the parent process not resident in main memory from the auxiliary memory to create pages for the child process in said logic address space.

2. The method of claim 1 further includes determining whether an excess of main memory capacity exists; copying the modified parent pages to create new child pages in main memory if excess capacity exists; and redefining the modified parent pages as pages of the child process after copying the modified pages to auxiliary memory if excess capacity does not exist.

3. The method of claim 2 wherein the step of determining whether excess memory capacity exists is conducted by polling a page availability counter.

4. The method of claim 1 wherein the step of copying the auxiliary memory pages of the parent process further includes determining whether an excess of main memory capacity exists; reading the parent pages into main memory and copying the parent pages to create new child pages in main memory if excess capacity exists; and copying the parent pages to child pages in auxiliary memory after reading the parent pages in from auxiliary memory if excess memory capacity does not exist 5. The method of claim 4 wherein the step of determining whether excess memory capacity exists is conducted by polling a page availability counter.

6. The method of claim 1 wherein the step of copying the auxiliary memory pages of the parent process further includes determining whether an excess of main memory capacity exists; reading the parent pages into main memory and then redefining the parent pages as child pages if excess capacity exists; and copying the parent pages to child pages in auxiliary memory after reading the parent pages in from auxiliary memory if excess memory capacity does not exist.

7. The method of claim 6 wherein the step of determining whether excess memory capacity exists is conducted by polling a page availability counter.

8. A process image copying system for copying a parent process having pages of information into a child process during a fork operation in a data processing system which employs virtual addressing to reference a physical memory, at least one page map to define the relationship between virtual addresses and their physical locations, and demand paging to allocate a logic address space, which address space defines a process (or task), distributed between a main memory and a lower density auxiliary memory, the pages of the parent process distributed in the main memory and the auxiliary memory wherein said pages resident in the main memory comprise modified and unmodified pages, the process copying system comprising;

a. redefining means for redefining the unmodified pages of the parent process resident in main memory as pages of the child process;
b. map modifying means for modifying the page map in response to page redefinitions by the redefining means;
c. copying means for copying pages of the parent process not resident in the main memory to create pages for the child process in said logic address space; and
d. central processing means connected to said redefining means, said map modifying means, and said copying means for controlling and coordinating the activities of each of said means.

9. The system of claim 8 wherein the system further includes a memory capacity monitoring means for determining whether an excess of main memory capacity exists.

10. The system of claim 9 wherein the monitoring means is a page availability counter.

* * * * *